United States Patent
Ha et al.

(10) Patent No.: US 12,007,806 B2
(45) Date of Patent: Jun. 11, 2024

(54) DISPLAY DEVICE

(71) Applicant: Samsung Display Co., Ltd., Yongin-si (KR)

(72) Inventors: Seunghwa Ha, Cheongju-si (KR); Sang Wol Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/714,299

(22) Filed: Apr. 6, 2022

(65) Prior Publication Data
US 2023/0041161 A1 Feb. 9, 2023

(30) Foreign Application Priority Data
Aug. 9, 2021 (KR) .................. 10-2021-0104695

(51) Int. Cl.
*G06F 1/16* (2006.01)

(52) U.S. Cl.
CPC .......... *G06F 1/1616* (2013.01); *G06F 1/1656* (2013.01)

(58) Field of Classification Search
CPC .... G06F 1/1616; G06F 1/1656; G06F 1/1652; G06F 1/1641; Y02E 10/549; G09F 9/301
See application file for complete search history.

(56) References Cited

U.S. PATENT DOCUMENTS

| | | | |
|---|---|---|---|
| 9,772,656 B2 | 9/2017 | Chong et al. | |
| 9,811,119 B2* | 11/2017 | Seo | G06F 1/1641 |
| 10,056,443 B2 | 8/2018 | Shyu et al. | |
| 10,074,824 B2 | 9/2018 | Han et al. | |
| 10,345,856 B2* | 7/2019 | Song | G06F 1/1616 |
| 10,908,639 B2* | 2/2021 | Shibayama | G06F 1/1658 |
| 11,132,027 B2 | 9/2021 | Park et al. | |
| 11,455,915 B2* | 9/2022 | Cho | G06F 1/1656 |
| 11,610,520 B2* | 3/2023 | Park | G06F 1/1641 |
| 2014/0055924 A1* | 2/2014 | Baek | G06F 1/163 361/679.01 |
| 2016/0209874 A1* | 7/2016 | Choi | G06F 1/1652 |
| 2019/0207141 A1* | 7/2019 | Kim | H10K 77/111 |
| 2019/0302850 A1* | 10/2019 | Park | G06F 1/1616 |
| 2019/0334114 A1* | 10/2019 | Park | G06F 1/1641 |
| 2020/0166970 A1* | 5/2020 | Yeom | G06F 1/1618 |
| 2020/0209925 A1* | 7/2020 | Paek | G06F 1/1652 |
| 2021/0068276 A1* | 3/2021 | Kim | H05K 5/0017 |
| 2021/0090475 A1* | 3/2021 | Wang | G06F 1/1656 |
| 2021/0104694 A1* | 4/2021 | Yee | H10K 71/00 |

(Continued)

FOREIGN PATENT DOCUMENTS

CN 211455156 U * 9/2020 .......... G06F 1/1616
KR 10-2016-0088521 7/2016

(Continued)

*Primary Examiner* — Rockshana D Chowdhury
(74) *Attorney, Agent, or Firm* — KILE PARK REED & HOUTTEMAN PLLC

(57) ABSTRACT

A display device includes a display panel including a first non-folding part, a folding part, and a second non-folding part which are arranged in a first direction, a first support part disposed below the display panel, a groove is defined in a top surface of a portion of the first support part overlapping the folding part, and the first support part being foldable about the folding part, a second support part disposed in the groove, and a cover layer disposed in the groove and below the second support part.

20 Claims, 8 Drawing Sheets

(56) References Cited

U.S. PATENT DOCUMENTS

| | | | |
|---|---|---|---|
| 2021/0118337 A1* | 4/2021 | Park | G09F 9/301 |
| 2021/0383731 A1* | 12/2021 | Watanabe | G09F 9/301 |
| 2022/0246069 A1* | 8/2022 | Nishio | G09F 9/301 |
| 2023/0083628 A1* | 3/2023 | Yamamoto | H01G 9/2077 |

FOREIGN PATENT DOCUMENTS

| | | |
|---|---|---|
| KR | 10-2018-0036904 | 4/2018 |
| KR | 10-2019-0116592 | 10/2019 |

* cited by examiner

DISPLAY DEVICE

CROSS-REFERENCE TO RELATED APPLICATION(S)

This U.S. non-provisional patent application claims priority to and the benefit of Korean Patent Application No. 10-2021-0104695 under 35 U.S.C. § 119, filed on Aug. 9, 2021, in the Korean Intellectual Property Office (KIPO), the entire contents of which are incorporated herein by reference.

BACKGROUND

The disclosure herein relates to a display device.

A display device displays various images on a display screen to provide information to a user. In general, a display device displays information within an assigned screen. Recently, foldable display devices including a foldable display panel that is capable of being folded have been developed. Unlike a rigid display device, the foldable display device may be folded or bent.

As the mid-to-large display device gradually increases in size, the weight also increases. As the size of the display device increases, a structure for reducing the weight thereof is required.

SUMMARY

The disclosure provides a display device having a lightweight lower structure.

An embodiment of the disclosure provides a display device including a display panel including a first non-folding part, a folding part, and a second non-folding part which are arranged in a first direction; a first support part disposed below the display panel, a groove being defined in a top surface of a portion of the first support part overlapping the folding part, and the first support being foldable about the folding part; a second support part disposed in the groove; and a cover layer disposed in the groove and below the second support part.

In an embodiment, the first support part may include a first sub support part disposed below the first non-folding part and a first portion of the folding part adjacent to the first non-folding part; and a second sub support part disposed below the second non-folding part and a second portion of the folding part adjacent to the second non-folding part. The groove may be defined in top surfaces of the first and second support parts overlapping the folding part in a plan view.

In an embodiment, the groove may be further defined in top surfaces of the first and second sub support parts overlapping the portions of the first and second non-folding parts adjacent to the folding part in a plan view.

In an embodiment, the first sub support part may include a 1-1-th sub support part disposed below the first non-folding part and having a first thickness; and a 1-2-th sub support part disposed below the first portion and having a second thickness less than the first thickness, wherein the second sub support part may include a 2-1-th sub support part disposed below the second non-folding part and having the first thickness; and a 2-2-th sub support part disposed below the second portion and having the second thickness.

In an embodiment, a top surface of the 1-2-th sub support part may be stepped to be lower than a top surface of the 1-1-th sub support part, a top surface of the 2-2-th sub support part may be stepped to be lower than a top surface of the 2-1-th sub support part, and bottom surfaces of the 1-1-th, 1-2-th, 2-1-th, and 2-2-th sub support parts may be defined on a same surface.

In an embodiment, the 1-1-th sub support part and the 1-2-th sub support part may be provided to be integrated with each other, and the 2-1-th sub support part and the 2-2-th sub support part may be provided to be integrated with each other.

In an embodiment, the cover layer may overlap a space between the first sub support part and the second sub support part in a plan view.

In an embodiment, a dummy groove overlapping the folding part in a plan view may be defined in a bottom surface of the cover layer.

In an embodiment, openings extending in a second direction and arranged in the first direction may be defined in the second support part.

In an embodiment, the cover layer may overlap the openings in a plan view.

In an embodiment, the first support part may have a specific gravity less than a specific gravity the second support part.

In an embodiment, the display device may further include a third support part disposed on a top surface of the first support part and a top surface of the second support part, which overlap the first and second non-folding parts. The third support part may have a hardness greater than a hardness of the first support part and less than a hardness of the second support part.

In an embodiment, the first support part and the second support part may be integrated with each other, and openings extending in a second direction and arranged in the first direction may be defined in the second support part overlapping the folding part in a plan view.

In an embodiment, the display device may further include a first auxiliary support part disposed below the cover layer and connected to a side of the first support part; and a second auxiliary support part disposed below the cover layer and connected to another side of the first support part. The first auxiliary support part and the second auxiliary support part may be spaced apart from each other in the first direction.

In an embodiment, each of the first and second auxiliary support parts may have a thickness less than a difference in thickness between the first support part and the second support part.

In an embodiment, each of the first auxiliary support part and the second auxiliary support part and each of the first support part and the second support part may have a same specific gravity.

In an embodiment, the display device may further include a first cushion layer disposed below the first support part and overlapping the first non-folding part in a plan view; and a second cushion layer disposed below the first support part and overlapping the second non-folding part in a plan view. The first auxiliary support part and the second auxiliary support part may be disposed between the first cushion layer and the second cushion layer.

In an embodiment, the first auxiliary support part may partially overlap the first support part in the first non-folding part in a plan view, and the second auxiliary support part may partially overlap the first support part in the second non-folding part in a plan view.

In an embodiment, the first auxiliary support part may be connected to the first support part in the first non-folding part, and the second auxiliary support part may be connected to the first support part in the second non-folding part.

In an embodiment, the first sub support part and the second sub support part may include carbon fiber reinforced plastics (CFRP) or an Al alloy.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain principles of the inventive concept. In the drawings.

DETAILED DESCRIPTION OF THE EMBODIMENTS

Figure 1:
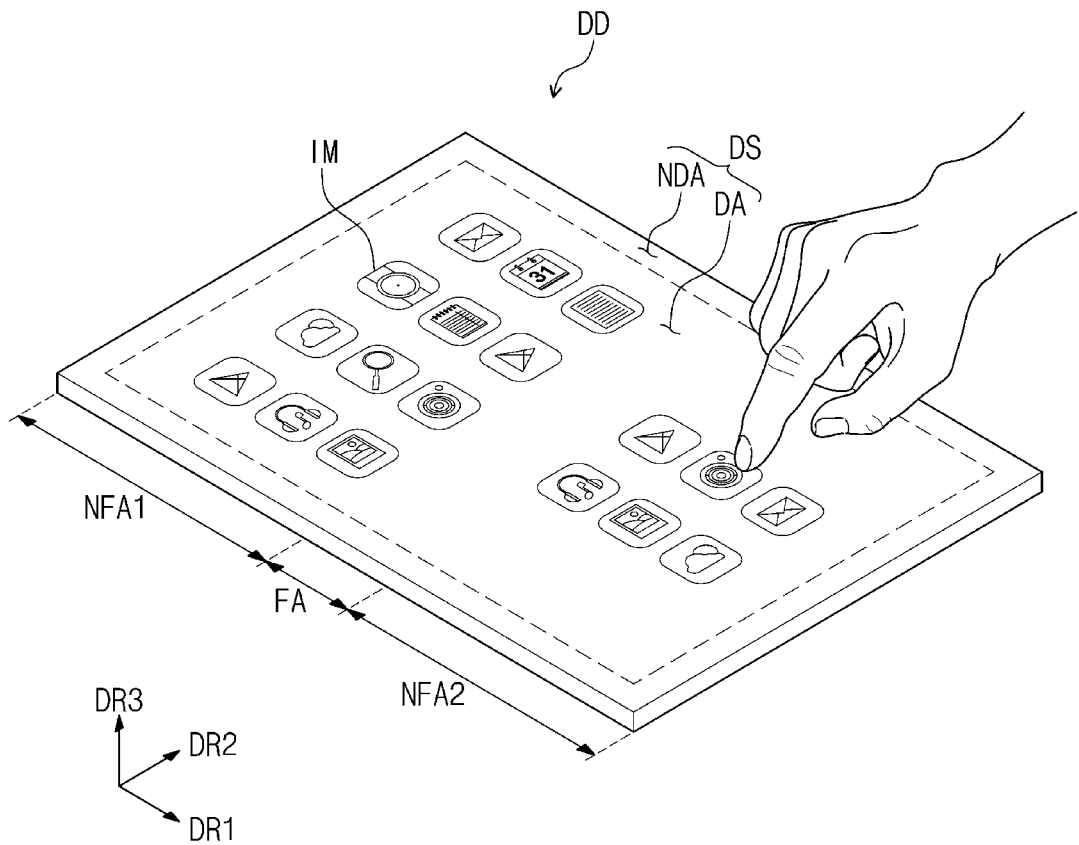
FIG. 1 is a schematic perspective view of a display device according to an embodiment of the disclosure.

In this specification, it will also be understood that when one component (or area, layer, portion) is referred to as being "on", "connected to", or "coupled to" another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as "first" and "second" are used herein to describe various elements, these elements should not be limited by these terms. The terms are only used to distinguish one component from other components. For example, a first element referred to as a first element in an embodiment can be referred to as a second element in another embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

It will be understood that the terms "contact," "connected to," and "coupled to" may include a physical and/or electrical contact, connection, or coupling.

Unless otherwise defined or implied herein, all terms (including technical and scientific terms) used herein have the same meaning as commonly understood by a person of ordinary skill in the art to which the inventive concept belongs. In addition, terms such as terms defined in commonly used dictionaries should be interpreted as having a meaning consistent with the meaning in the context of the related technology, and unless explicitly defined here, they are interpreted as too ideal or too formal sense.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, embodiments of the disclosure will be described with reference to the accompanying drawings.

Figure 2:
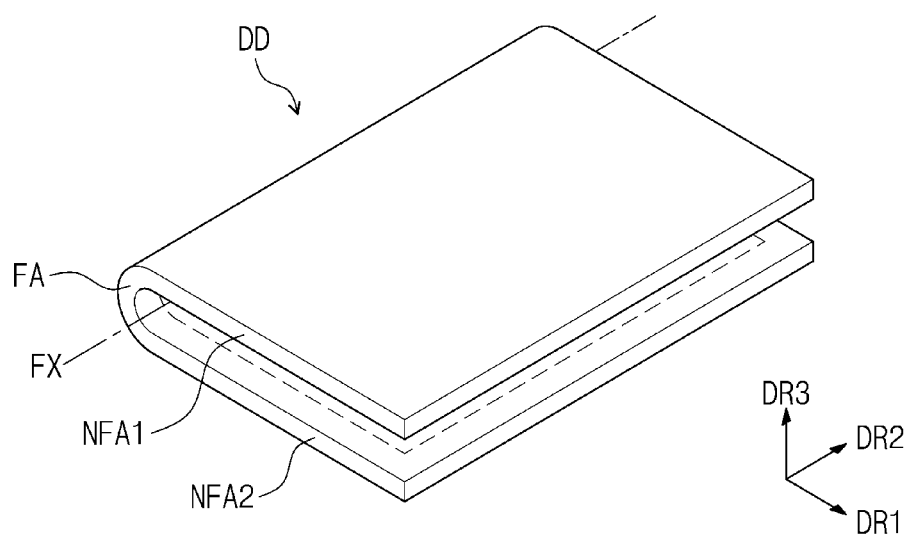
FIG. 2 is a schematic view illustrating a folded state of the display device of FIG. 1.

FIG. 1 is a schematic perspective view of a display device according to an embodiment. FIG. 2 is a schematic view illustrating a folded state of the display device of FIG. 1.

Referring to FIG. 1, a display device DD according to an embodiment may have a rectangular shape with long sides in a first direction DR1 and short sides in a second direction DR2 intersecting the first direction DR1. However, the embodiment is not limited thereto. For example, the display device DD may have various shapes such as a circular shape, a polygonal shape, and the like. The display device DD may be a flexible display device.

The display device DD may include a folding part FA and non-folding parts NFA1 and NFA2. The non-folding parts NFA1 and NFA2 may include a first non-folding part NFA1 and a second non-folding part NFA2. The folding part FA may be disposed between the first non-folding part NFA1 and the second non-folding part NFA2. The first non-folding part NFA1, the folding part FA, and the second non-folding part NFA2 may be arranged in the first direction DR1.

For example, FIGS. 1 and 2 illustrate a folding part FA and two non-folding parts NFA1 and NFA2, but the numbers of the folding part FA and non-folding parts NFA1 and NFA2 are not limited thereto. For example, the display device DD may include two or more non-folding parts, and folding parts disposed between the two or more non-folding parts.

A top surface of the display device DD may be defined as a display surface DS and have a plane defined by the first direction DR1 and the second direction DR2. Images IM generated from the display device DD may be provided to a user through the display surface DS.

The display surface DS may include a display part DA and a non-display part NDA around the display part DA. The display part DA may display an image, and the non-display part NDA may not display an image. The non-display part NDA may surround the display part DA and define an edge of the display device DD printed in a color (e.g., a predetermined or selected color).

Referring to FIG. 2, the display device DD may be a folding-type (foldable) display device DD that is capable of being folded or unfolded. For example, the folding part FA may be bent with respect to a folding axis FX parallel to the second direction DR2, and thus, the display device DD may be folded. The folding axis may be defined as a short axis parallel to the short side of the display device DD.

In case that the display device DD is folded, the first non-folding part NFA1 and the second non-folding parts NFA2 may face each other, and the display device DD may be in-folded to prevent the display surface DS from being exposed to the outside.

Figure 3:
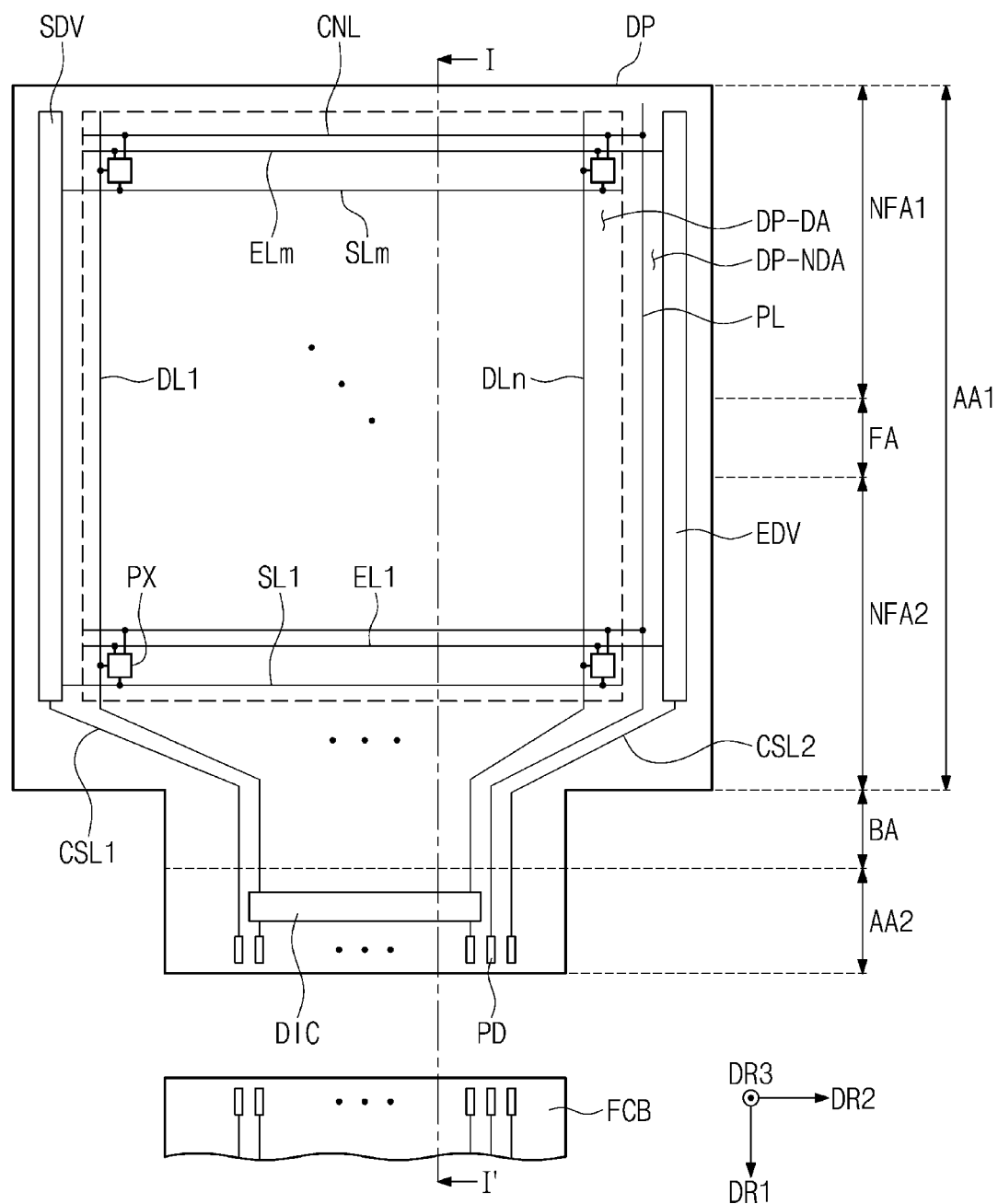
FIG. 3 is a schematic plan view of the display panel according to an embodiment of the disclosure.

FIG. 3 is a schematic plan view of the display panel according to an embodiment.

Referring to FIG. 3, a display part DP-DA and a non-display part DP-NDA around the display part DP-DA may be defined on a display panel DP. The display part DP-DA and the non-display part DP-NDA may be distinguished from each other according to whether a pixel PX is disposed. The pixel PX may be disposed on the display part DP-DA. A scan driver SDV, a data driver, and an emission driver EDV may be disposed on the non-display part DP-NDA. The data driver may be a partial circuit configured in a driving chip DIC.

The display panel DP may include a first panel area AA1, a bending part BA, and a second panel area AA2 defined in the first direction DR1. The second panel area AA2 and the bending part BA may be part of the non-display part DP-NDA. The bending part BA is disposed between the first panel area AA1 and the second panel area AA2.

The first panel area AA1 corresponds to the display surface DS of FIG. 1. The first panel area AA1 may include a first non-folding part NFA1, a second non-folding part NFA2, and a folding part FA.

Each of the bending part BA and the second panel area AA2, which are parallel to the second direction DR2, may have a width (or length) less than that of the first panel area AA1 parallel to the second direction DR2. As the width of the bending part BA decreases in the direction of the folding axis FX, the bending part BA may be more readily bent.

The display panel DP may include pixels PX, scan lines SL1 to SLm, data lines DL1 to DLn, emission lines EL1 to ELm, first and second control lines CSL1 and CSL2, a power line PL, and pads PD, where m and n are natural numbers. The pixels PX may be electrically connected to the scan lines SL1 to SLm, the data lines DL1 to DLn, and the emission lines EL1 to ELm.

The scan lines SL1 to SLm may extend in the second direction DR2 and be electrically connected to the scan driver SDV. The data lines DL1 to DLn may extend in the first direction DR1 and be electrically connected to the driving chip DIC via the bending part BA. The emission lines EL1 to ELm may extend in the second direction DR2 and be electrically connected to the emission driver EDV.

The first power line PL1 may include a portion extending in the first direction DR1 and a portion extending in the second direction DR2. The portion extending in the first direction DR1 and the portion extending in the second direction DR2 may be disposed on different layers. The portion of the power line PL, which extends in the first direction DR1, may extend to the second panel area AA2 via the bending part BA. The power line PL may be electrically connected to the pixels PX and may provide a first voltage to the pixels PX.

The first control line CSL1 may be electrically connected to the scan driver SDV to extend toward a lower end of the second panel area AA2 via the bending part BA. The second control line CSL2 may be electrically connected to the emission driver EDV to extend toward the lower end of the second panel area AA2 via the bending part BA. At least one connection line CNL may be electrically connected to the pixels PX.

In a plan view, the pads PD may be disposed adjacent to the lower end of the second panel area AA2. The driving chip DIC, the power line PL, the first control line CSL1, and the second control line CSL2 may be electrically connected to the pads PD. The data lines DL1 to DLn may be electrically connected to the pads PD through the driving chip DIC. A flexible circuit board FCB may be electrically connected to the pads PD through an anisotropic conductive adhesive layer.

Although not shown in the drawings, the flexible circuit board FCB may be electrically connected to a printed circuit board. A timing controller for controlling operations of the scan driver SDV, the data driver, and the emission driver EDV and a voltage generator for generating an operating voltage may be disposed on the printed circuit board.

A control signal and an image signal, which are generated by the timing controller, may be provided to the scan driver SDV, the data driver, and the emission driver EDV through the pads PD. The first voltage generated by the voltage generator may be provided to the power line PL through the pads PD.

Figure 4:
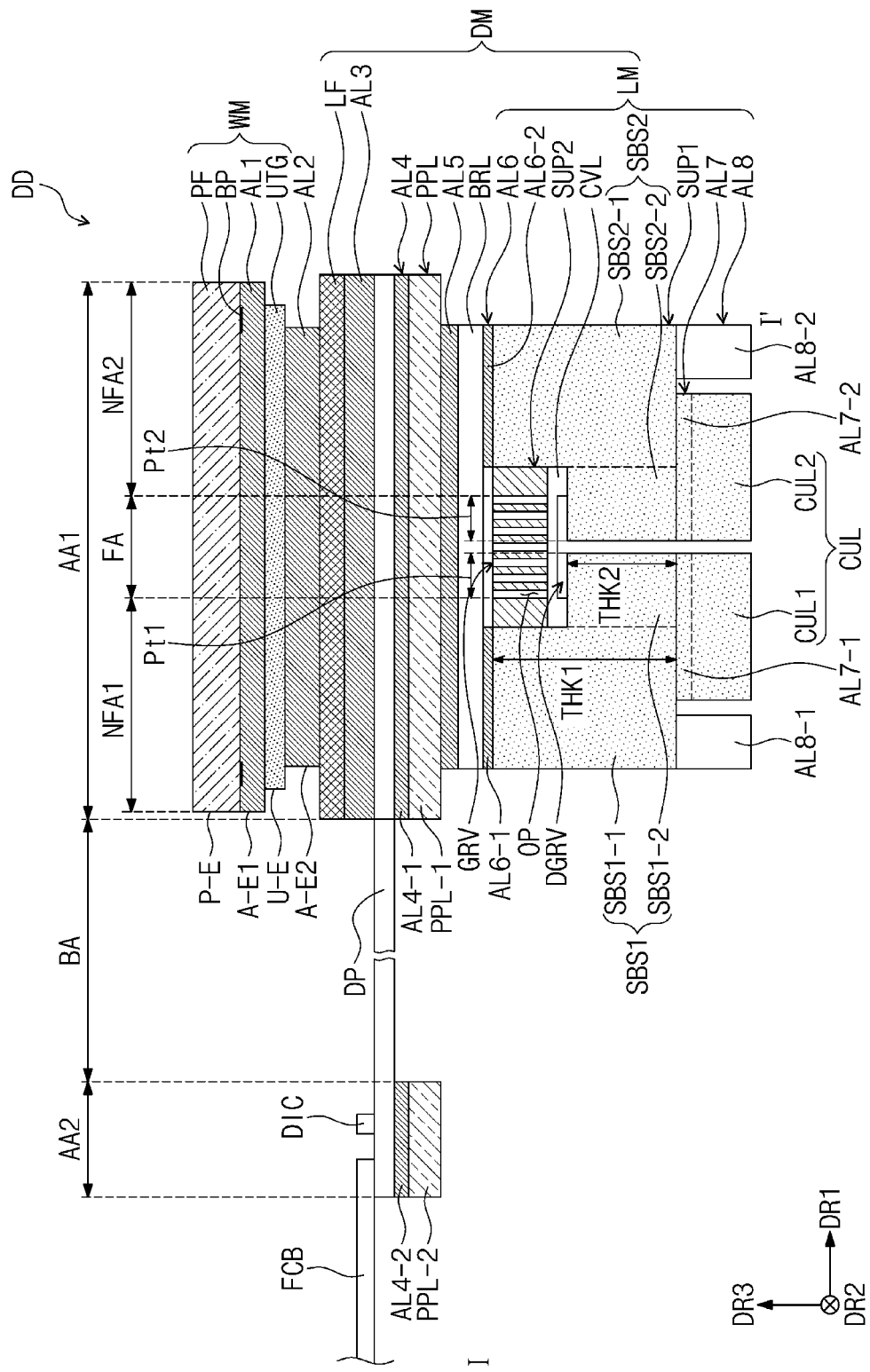
FIG. 4 is a schematic cross-sectional view taken along line I-I' of FIG. 3.

FIG. 4 is a schematic cross-sectional view taken along line I-I' of FIG. 3.

Referring to FIG. 4, the display device DD may include a window module WM and a display module DM. The window module WM may include a window UTG, a protective film PF disposed on the window UTG, a first adhesive layer AL1 connecting (e.g., coupling) the window UTG to the protective film PF, and a bezel pattern BP.

The bezel pattern BP overlaps (e.g., in a plan view) the non-display part NDA illustrated in FIG. 1. The bezel pattern BP may be disposed on a surface of the window UTG or a surface of the protective film PF. FIG. 4 illustrates an example in which the bezel pattern BP is disposed on a bottom surface of the protective film PF. However, the embodiment is not limited thereto, and the bezel pattern BP may be disposed on a top surface of the protective film PF.

The bezel pattern BP may be disposed on the protective film PF as a colored light blocking layer, for example, in a coating manner. The bezel pattern BP may include a base material and a dye or pigment mixed with the base material. The bezel pattern BP may have a closed line shape on a plane (or in a plan view).

The window UTG may be chemically strengthened glass. The window UTG may have optically transparent properties.

The protective film PF may include polyimide, polycarbonate, triacetylcellulose, polymethylmethacrylate, or polyethylene terephthalate. Although not shown in the drawings, at least one of a hard coating layer, an anti-fingerprint layer, or an anti-reflective layer may be disposed on a top surface of the protective film PF.

The first adhesive layer AL1 may be a pressure-sensitive adhesive film (PSA) or an optically clear adhesive (OCA). Adhesive layers to be described below are also the same as the first adhesive layer AL1 and may include a typical adhesive. An entire surface of the window UTG may adhere to the first adhesive layer AL1.

The first adhesive layer AL1 may have a thickness that is sufficient to cover the bezel pattern BP. For example, the bezel pattern BP may have a thickness of about 3 micrometers to about 8 micrometers, and the first adhesive layer AL1 may have a thickness at a level at which bubbles are not generated in the periphery of the bezel pattern BP. For example, the thickness of the first adhesive layer AL1 may be about 20 micrometers to about 50 micrometers, for example, about 35 micrometers.

The first adhesive layer AL1 may be separated from the window UTG. Since strength of the protective film PF is lower than that of the window UTG, scratches may occur relatively readily thereon. After the first adhesive layer AL1 and the protective film PF are separated, a new protective film PF may be attached to the window UTG.

In a plan view, an edge U-E of the window UTG does not overlap the bezel pattern BP. As the above-described conditions are satisfied, the edge U-E of the window UTG may be exposed from the bezel pattern BP.

In a plan view, an edge P-E of the protective film PF and an edge A-E1 of the first adhesive layer AL1 may be aligned with each other. The protective film PF and the first adhesive layer AL1 may have a same surface area and a same shape.

The window module WM and the display module DM may be attached to each other by a second adhesive layer AL2. The second adhesive layer AL2 may include a transparent adhesive such as a pressure-sensitive adhesive or an optically transparent adhesive.

In a plan view, an edge A-E2 of the second adhesive layer AL2 may overlap the window module WM. For example, the edge A-E2 of the second adhesive layer AL2 may overlap the window UTG. In the process of attaching the window module WM to the display module DM, a pressure may be applied to the second adhesive layer AL2. The second adhesive layer AL2 may receive a pressure and then be stretched in a direction parallel to the first direction DR1 and the second direction DR2. A surface area of the second adhesive layer AL2 may be less than that of the window UTG so that the second adhesive layer AL2 does not protrude from the window UTG.

The display module DM may include an optical film LF, a display panel DP, a panel protective layer PPL, a barrier layer BRL, a lower module LM, and third to fifth adhesive layers AL3 to AL5. Each of the third to fifth adhesive layers AL3 to AL5 may include a transparent adhesive such as a pressure-sensitive adhesive or an optically transparent adhesive. Some of the above-described configurations according to an embodiment may be omitted or further include other configurations. In addition, a lamination order illustrated in FIG. 4 is only an example, and the lamination order of the respective components may be changed.

The optical film LF is disposed on the first panel area AA1. The optical film LF covers (or overlaps in a plan view) at least the display part DP-DA (see FIG. 3). The second adhesive layer AL2 is connected (e.g., coupled or attached) to the optical film LF and the window module WM, and the third adhesive layer AL3 is connected to the optical film LF and the display panel DP.

The panel protective layer PPL may be disposed below the display panel DP. The panel protective layer PPL may protect a lower portion of the display panel DP. The panel protective layer PPL may include a flexible plastic material. The panel protective layer PPL may prevent scratches from occurring on a rear surface of the display panel DP during the process of manufacturing the display panel DP. The panel protective layer PPL may be a colored polyimide film. For example, the panel protective layer PPL may be an opaque yellow film, but the disclosure is not limited thereto.

The panel protective layer PPL may not be disposed on the bending part BA. The panel protective layer PPL may include a first panel protective layer PPL-1 protecting the first panel area AA1 of the display panel DP and a second panel protective layer PPL-2 protecting the second panel area AA2 of the display panel DP. In case that the bending part BA is bent, the second panel protective layer PPL-2 may be disposed below the first panel area AA1 and the first panel protective layer PPL-1 together with the second panel area AA2 of the display panel DP. Since the panel protective layer PPL is not disposed on the bending part BA, the bending part BA may be more readily bent.

The fourth adhesive layer AL4 may connect the panel protective layer PPL to the display panel DP. The fourth adhesive layer AL4 may include a 4-1-th adhesive layer AL4-1 corresponding to the first panel protective layer PPL-1 and a 4-2-th adhesive layer AL4-2 corresponding to the second panel protective layer PPL-2. The 4-1-th adhesive layer AL4-1 may connect the first panel protective layer PPL-1 to the first panel area AA1 of the display panel DP, and the 4-2-th adhesive layer AL4-2 may connect the second panel protective layer PPL-2 to the second panel area AA2 of the display panel DP.

The barrier layer BRL may be disposed below the panel protective layer PPL. The fifth adhesive layer AL5 may be disposed between the panel protective layer PPL and the barrier layer BRL to attach (or bond) the barrier layer BRL to the panel protective layer PPL.

The barrier layer BRL may improve resistance to compressive force due to external pressing. Thus, the barrier layer BRL may serve to prevent deformation of the display panel DP from occurring. The barrier layer BRL may include a flexible plastic material such as polyimide or polyethylene terephthalate.

The barrier layer BRL may absorb light incident thereon from the outside. The barrier layer BRL may include a light blocking material or a colored film having low light transmittance. For example, the barrier layer BRL may be a black plastic film, for example, a black polyimide film. In case that the display module DM is viewed from an upper side of the window module WM, components disposed below the barrier layer BRL may not be visually recognized by a user.

The lower module LM may be disposed below the barrier layer BRL. The lower module LM may include a first support part SUP1, a second support part SUP2, a cover layer CVL, a cushion layer CUL, and sixth to eighth adhesive layers AL6 to AL8.

The lower module LM may support the components disposed above the lower module LM and maintain the unfolded state and the folded state of the display device DD.

The first support part SUP1 may be disposed below the barrier layer BRL. The first support part SUP1 may include a first sub support part SBS1 and a second sub support part SBS2 which are spaced apart from each other in the first direction DR1. The first sub support part SBS1 may be disposed below the first non-folding part NFA1 and a first portion Pt1 of the folding part FA, and the second sub support part SBS2 may be disposed below the second non-folding part NFA2 and a second portion Pt2 of the folding part FA.

The first portion Pt1 may be defined as a portion of the folding portion FA adjacent to the first non-folding part NFA1. The second portion Pt2 may be defined as a portion of the folding part FA adjacent to the second non-folding part NFA2.

The first support part SUP1 may include a groove GRV defined in a top surface of a portion thereof overlapping the folding part FA. The groove GRV may be defined in a top surface of the first sub support part SBS1 and a top surface of the second sub support part SBS2, which overlap the folding part FA. The groove GRV may also be defined in top surfaces of the first and second sub support parts SBS1 and SBS2 overlapping portions of the first and second non-folding parts NFA1 and NFA2 adjacent to the folding part FA.

The first sub support part SBS1 may include a 1-1-th sub support part SBS1-1 and a 1-2-th sub support part SBS1-2, and the second sub support part SBS2 may include a 2-1-th sub support part SBS2-1 and a 2-2-th sub support part SBS2-2. According to an embodiment, the first sub support part SBS1 and the second sub support part SBS2 may not include stainless steel, but may include carbon fiber reinforced plastics (CFRP) or an Al alloy. Thus, each of the first sub support part SBS1 and the second sub support part SBS2 may be reduced in specific gravity when compared to the case in which each of the first sub support part SBS1 and the second sub support part SBS2 includes stainless steel. However, the embodiment is not limited thereto, and each of the first sub support part SBS1 and the second sub support part SBS2 may include a material having a specific gravity less than that of stainless steel.

Since each of the first sub support part SBS1 and the second sub support part SBS2 includes the material having the specific gravity less than that of stainless steel, the weight of the lower module LM including the first sub support part SBS1 and the second sub support part SBS2 may be reduced.

The 1-1-th sub support part SBS1-1 may be disposed below the first non-folding part NFA1. The 1-1-th sub support part SBS1-1 may have a first thickness THK1 defined in the third direction DR3.

The 1-2-th sub support part SBS1-2 may be disposed below the first portion Pt1. The 1-2-th sub support part SBS1-2 may have a second thickness THK2 defined in the third direction DR3. The second thickness THK2 may be less than the first thickness THK1. Thus, the 1-2-th sub support part SBS1-2 may be thinner than the 1-1-th sub support part SBS1-1 in the third direction DR3. The 1-2-th sub support part SBS1-2 may be integrated with the 1-1-th sub support part SBS1-1. However, the embodiment is not limited thereto, and the 1-2-th sub support part SBS1-2 may be manufactured separately from the 1-1-th sub support part SBS1-1 and be connected to the 1-1-th sub support part SBS1-1.

The 2-1-th sub support part SBS2-1 may be disposed below the second non-folding part NFA2. The 2-1-th sub support part SBS2-1 may have the first thickness THK1.

The 2-2-th sub support part SBS2-2 may be disposed below the second portion Pt2. The 2-2-th sub support part SBS2-2 may have the second thickness THK2. Thus, the 2-2-th sub support part SBS2-2 may be thinner than the 1-1-th sub support part SBS1-1 in the third direction DR3. The 2-2-th sub support part SBS2-2 may be integrated with the 2-1-th sub support part SBS2-1. However, the embodiment is not limited thereto, and the 2-2-th sub support part SBS2-2 may be manufactured separately from the 2-1-th sub support part SBS2-1 and then be connected to the 2-1-th sub support part SBS2-1.

A top surface of the 1-2-th sub support part SBS1-2 may be stepped to be lower than a top surface of the 1-1-th sub support part SBS1-1 by the groove GRV. A top surface of the 2-2-th sub support part SBS2-2 may be stepped to be lower than a top surface of the 2-1-th sub support part SBS2-1 by the groove GRV.

A bottom surface of the 1-1-th sub support part SBS1-1, a bottom surface of the 1-2-th sub support part SBS1-2, a bottom surface of the 2-1-th sub support part SBS2-1, and a bottom surface of the 2-2-th sub support part SBS2-2 may have a same surface.

The second support part SUP2 may be disposed in the groove GRV. Openings OP extending in the second direction DR2 and arranged in the first direction DR1 may be defined in the second support part SUP2. A specific gravity of the second support part SUP2 may be greater than a specific gravity of the first support part SUP1. The second support part SUP2 may include a metal material such as stainless steel. For example, the second support part SUP2 may include SUS 304, but is not limited thereto. A material having high rigidity such as SUS 304 may be used for the second support part SUP2 to reinforce rigidity of the folding part FA.

The cover layer CVL may be disposed in the groove GRV and be disposed below the second support part SUP2. The cover layer CVL may cover (or overlap in a plan view) a space between the first sub support part SBS1 and the second sub support part SBS2. A dummy groove DGRV overlapping the folding part FA may be defined on a bottom surface of the cover layer CVL. The cover layer CVL may be more readily folded by the dummy groove DGRV during the folding operation.

The cover layer CVL may be attached to the second support part SUP2 by an adhesive. The cover layer CVL may be manufactured in the form of a sheet and be attached. The cover layer CVL may cover the openings OP defined in the second support part SUP2. The cover layer CVL may prevent foreign substances from being introduced into the openings OP. The cover layer CVL may have an elastic modulus less than that of the second support part SUP2. For example, the cover layer CVL may include thermoplastic polyurethane, rubber, or silicone, but the material of the cover layer CVL is not limited thereto.

The cushion layer CUL may be disposed below the first support part SUP1. The cushion layer CUL may absorb an external impact to protect the display panel DP. The elastic modulus of the cushion layer CUL is less than that of the first support part SUP1. The cushion layer CUL may include a foam sheet having an elastic force (e.g., a predetermined or selected elastic force). The cushion layer CUL may include sponge or polyurethane.

The cushion layer CUL may include a first cushion layer CUL1 disposed below the first sub support part SBS1 and a second cushion layer CUL2 disposed below the second sub support part SBS2. The first cushion layer CUL1 and the second cushion layer CUL2 may be spaced from each other by a distance in the first direction DR1. In a plan view, the first cushion layer CUL1 may overlap a portion of the folding part FA and the first non-folding part NFA1, and the second cushion layer CUL2 may overlap another portion of the folding part FA and the second non-folding part NFA2.

The sixth adhesive layer AL6 may be disposed between the barrier layer BRL and the lower module LM. The sixth adhesive layer AL6 may connect the barrier layer BRL and the lower module LM to each other.

The sixth adhesive layer AL6 may include a 6-1-th adhesive layer AL6-1 and a 6-2-th adhesive layer AL6-2 which are spaced apart from each other.

The 6-1-th adhesive layer AL6-1 and the 6-2-th adhesive layer AL6-2 may be spaced apart from each other with the openings OP therebetween. In a plan view, the sixth adhesive layer AL6 may not overlap the openings OP. In a plan view, the sixth adhesive layer AL6 may be spaced apart from the openings OP.

The 6-1-th adhesive layer AL6-1 may overlap the first non-folding part NFA1, the 6-2-th adhesive layer AL6-2 may overlap the second non-folding part NFA2, and each of the 6-1-th adhesive layer AL6-1 and the 6-2-th adhesive layer AL6-2 may not overlap the folding part FA. Since the sixth adhesive layer AL6 is not disposed on a portion corresponding to the folding part FA, flexibility of the lower module LM may be improved.

The barrier layer BRL may be spaced apart from the lower module LM in the portion overlapping the folding part FA. For example, the second support part SUP2 and the barrier layer BRL may be spaced apart from each other in the portion overlapping the folding part FA. Air may be disposed in the groove GRV between the second support part SUP2 and the barrier layer BRL.

In case that the display device DD is folded, the groove GRV is defined between the barrier layer BRL and the second support part SUP2, and thus the shape of the openings OP defined in the second support part SUP2 may not be visually recognized from the outside of the display device DD.

As the barrier layer BRL includes a light blocking material or is applied as a colored film having low light transmittance, a difference in color between the barrier layer BRL and the second support part SUP2 may not be visually recognized from the outside. For example, in the second support part SUP2, a difference in color between a first support area in which the openings OP is defined and a second support area in which the openings OP is not defined, may not be visually recognized from the outside. The first support area may be an area overlapping the folding part FA in a plan view, and the second support area may be an area overlapping the first non-folding part NFA1 and the second non-folding part NFA2 in a plan view.

The sixth adhesive layer AL6 may have a thickness less than that of the fifth adhesive layer AL5.

As the thickness of the sixth adhesive layer AL6 decreases, a height difference (or thickness or step difference) due to the sixth adhesive layer AL6 may be reduced. As the step difference is smaller, shape deformation of the laminated structures due to the folding and unfolding of the display device DD may be reduced. However, the openings OP may be visually recognized, or the sixth adhesive layer AL6 may be separated by the repeated folding operations. As the thickness of the sixth adhesive layer AL6 increases, the openings OP may not be visually recognized, and reliability of adhesive force of the sixth adhesive layer AL6 may be improved for the repeated folding operations, but the height different may increase. Thus, the thickness of the sixth adhesive layer AL6 may be selected within an appropriate range in consideration of folding reliability, adhesion reliability, and visibility of the openings OP.

The seventh adhesive layer AL7 may be disposed below the first support part SUP1. The seventh adhesive layer AL7 may include a 7-1-th adhesive layer AL7-1 and a 7-2-th adhesive layer AL7-2. The 7-1-th adhesive layer AL7-1 and the 7-2-th adhesive layer AL7-2 may be spaced from each other. In a plan view, the 7-1-th adhesive layer AL7-1 and the 7-2-th adhesive layer AL7-2 may be spaced from each other with the openings OP therebetween. The 7-1-th adhesive layer AL7-1 and the 7-2-th adhesive layer AL7-2 may not overlap each other in the folding part FA.

The eighth adhesive layer AL8 may be attached to the first support part SUP1. The eighth adhesive layer AL8 may include an 8-1-th adhesive layer AL8-1 and an 8-2-th adhesive layer AL8-2. The 8-1-th adhesive layer AL8-1 and the 8-2-th adhesive layer AL8-2 may be spaced apart from each other. In a plan view, the 8-1-th adhesive layer AL8-1 and the eight-2 adhesive layer AL8-2 may be spaced apart from each other with the cushion layer CUL therebetween.

The bending part BA may be bent so that the second panel area AA2 is disposed below the first panel area AA1. Thus, the driving chip DIC may be disposed below the first panel area AA1. For example, the first panel area AA1 and the second panel area AA2 may be disposed on different planes (or reference surfaces).

Figure 5:
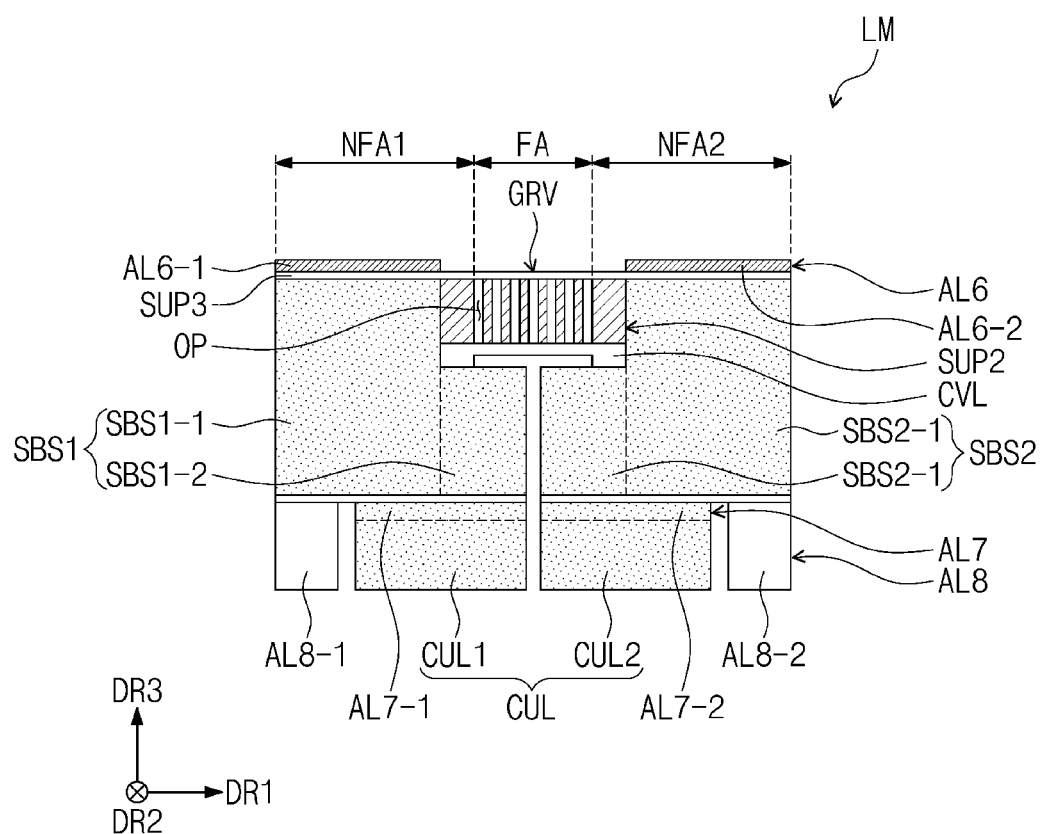
FIG. 5 is a schematic cross-sectional view of a lower module according to an embodiment of the disclosure.

FIG. 5 is a schematic cross-sectional view of the lower module according to an embodiment.

FIG. 5 is a schematic view illustrating an example of the lower module LM including the Al alloy. For convenience of description, the same reference numerals are used to denote the same components as those of the lower module LM illustrated in FIG. 4, and descriptions thereof will be omitted.

Referring to FIG. 5, the first support part SUP1 of the lower module LM may include an Al alloy. In the first support part SUP1 including the Al alloy, a third support part SUP3 may be disposed on a top surface of the first support part SUP1 overlapping the first and second non-folding parts NFA1 and NFA2, a top surface of the second support part SUP2, and a bottom surface of the first support part SUP1.

The hardness of the third support part SUP3 may be greater than that of the first support part SUP1 and less than that of the second support part SUP2.

The third support part SUP3 may cover a surface of the first support part SUP1 to reinforce the hardness of the first support part SUP1. The third support part SUP3 may prevent scratches and damage from occurring on the surface of the first support part SUP1. Thus, surface properties of the first support part SUP1 may be improved by the third support part SUP3.

Figure 6:
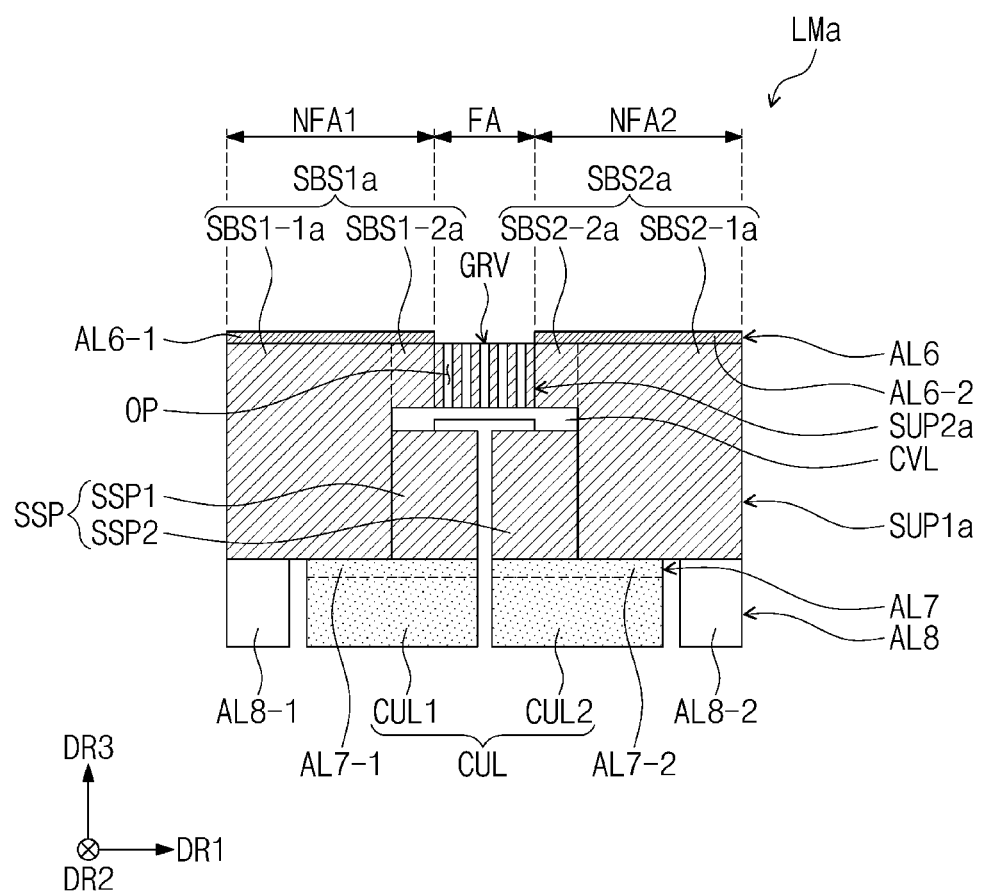
FIG. 6 is a schematic cross-sectional view of a lower module according to an embodiment of the disclosure.

FIG. 6 is a schematic cross-sectional view of the lower module according to an embodiment.

For convenience of description, the same reference numerals are used to denote the same components as those of the lower module LM illustrated in FIG. 4, and descriptions thereof will be omitted.

Referring to FIG. 6, a first support part SUP1a and a second support part SUP2a of a lower module LMa may be integrally connected to each other (or may be integral with each other). Openings OP extending in the second direction DR2 and arranged in the first direction DR1 may be defined in the second support part SUP2a.

The cover layer CVL may be disposed below the second support part SUP2a.

An auxiliary support part SSP may be disposed below the cover layer CVL. The auxiliary support part SSP may include a first auxiliary support part SSP1 and a second auxiliary support part SSP2. The first auxiliary support part SSP1 may overlap a 1-2-th sub support part SBS1-2a and a portion of the folding part FA adjacent to the 1-2-th sub support part SBS1-2a, and the second auxiliary support part SSP2 may overlap a 2-2-th sub support part SBS2-2a and another portion of the folding part FA adjacent to the 2-2-th sub support part SBS2-2a.

The first auxiliary support part SSP1 may be connected to a 1-1-th sub support part SBS1-1a, and the second auxiliary support part SSP2 may be connected to a 2-1-th sub support part SBS2-1a. The first auxiliary support part SSP1 and the second auxiliary support part SSP2 may be spaced apart from each other in the first direction DR1.

A thickness of the first auxiliary support part SSP1 in the third direction DR3 may be less than a difference in thickness between the 1-1-th sub support part SBS1-1a in the third direction DR3 and the second support part SUP2a in the third direction DR3. A thickness of the second auxiliary support part SSP2 in the third direction DR3 may be less than a difference in thickness between the 2-1-th sub support part SBS2-1a and the second support part SUP2a.

A specific gravity of the auxiliary support part SSP may be the same as that of each of the first support part SUP1a and the second support part SUP2a. According to an embodiment, the first support part SUP1a, the second support part SUP2a, and the auxiliary support part SSP may not include stainless steel, but may include carbon fiber reinforced plastics (CFRP) or an Al alloy. Therefore, the specific gravity of each of the first support part SUP1a, the second support part SUP2a, and the auxiliary support part SSP may be lower than that when each of the first support part SUP1a, the second support part SUP2a, and the auxiliary support part SSP includes stainless steel. However, the embodiment is not limited thereto, and each of the first support part SUP1a, the second support part SUP2a, and the auxiliary support part SSP may include a material having a specific gravity less than that of stainless steel.

Since each of the first support part SUP1a, the second support part SUP2a, and the auxiliary support part SSP includes the material having the specific gravity less than that of stainless steel, the weight of the lower module LMa including the first support part SUP1a, the second support part SUP2a, and the auxiliary support part SSP may be reduced.

Figure 7:
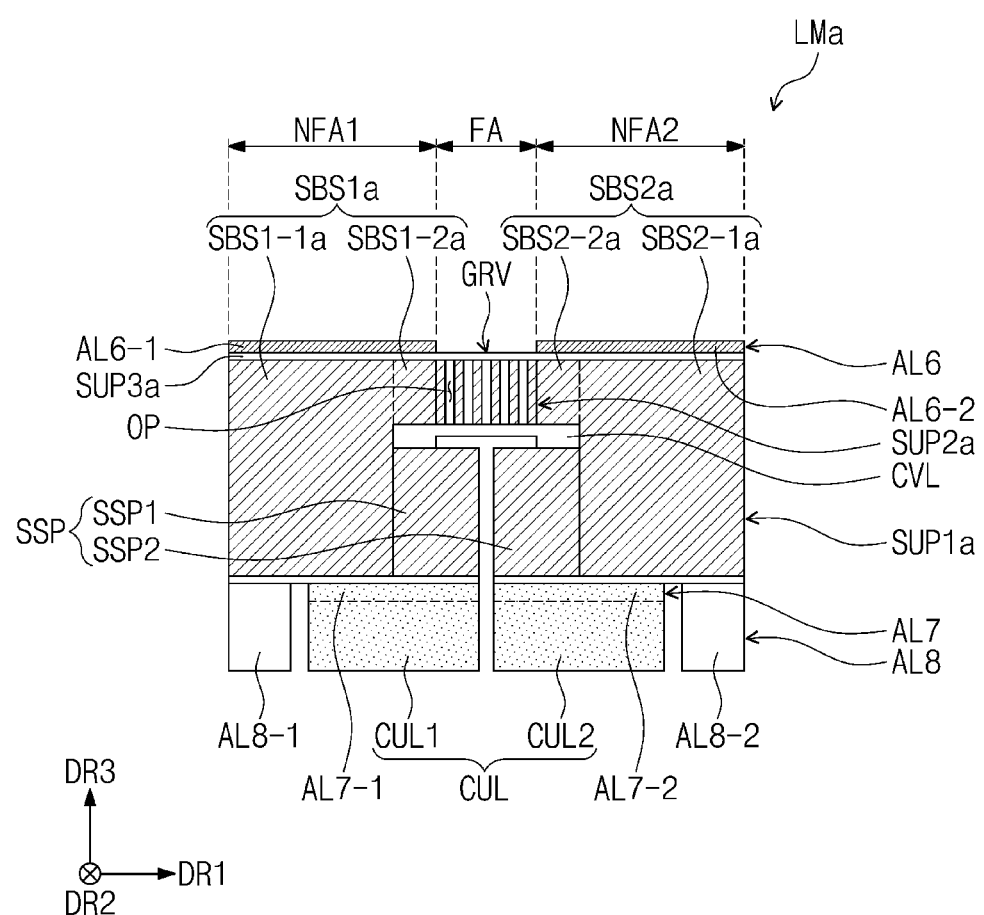
FIG. 7 is a schematic cross-sectional view of a lower module according to an embodiment of the disclosure.

FIG. 7 is a schematic cross-sectional view of the lower module according to an embodiment.

FIG. 7 is a schematic diagram illustrating an example of a lower module LMa including an Al alloy. For convenience of description, the same reference numerals are used to denote the same components as those of the lower module LMa illustrated in FIG. 6, and descriptions thereof will be omitted.

Referring to FIG. 7, each of a first support part SUP1a, a second support part SUP2a, and an auxiliary support part SSP of the lower module LMa may include an Al alloy. In the first support part SUP1a, the second support part SUP2a, and the auxiliary support part SSP, each of which includes the Al alloy, a third support part SUP3a may be disposed on a top surface of the first support part SUP1a, a top surface of the second support part SUP2a, a bottom surface of a 1-1-th sub support part SBS1-1a, a bottom surface of a 2-1-th sub support part SBS2-1a, and a bottom surface of the auxiliary support part SSP.

The hardness of the third support part SUP3a may be greater than that of each of the first support part SUP1a, the second support part SUP2a, and the auxiliary support part SSP.

The third support part SUP3a may cover surfaces of the first support part SUP1a, the second support part SUP2a, and the auxiliary support part SSP to reinforce the hardness of each of the first support part SUP1a, the second support part SUP2a, and the auxiliary support part SSP. The third support part SUP3a may prevent scratches and damage from occurring on the surfaces of the first support part SUP1a, the second support part SUP2a, and the auxiliary support part SSP. Thus, surface properties of the first support part SUP1a, the second support part SUP2a, and the auxiliary support part SSP may be improved by the third support part SUP3a.

Figure 8:
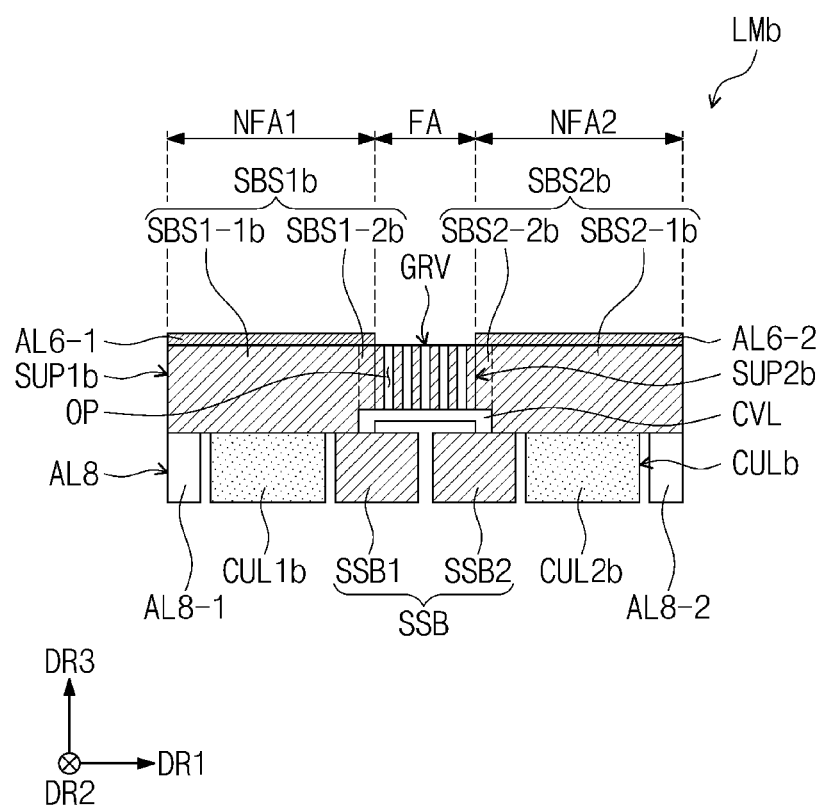
FIG. 8 is a schematic cross-sectional view of a lower module according to an embodiment of the disclosure.

FIG. 8 is a schematic cross-sectional view of the lower module according to an embodiment.

For convenience of description, the same reference numerals are used to denote the same components as those of the lower module LM illustrated in FIG. 4, and descriptions thereof will be omitted.

Referring to FIG. 8, a first sub support part SBS1b, a second sub support part SBS2b, and a second support part SUP2b may be integrally connected to each other. The first sub support part SBS1b may include a 1-1-th sub support part SBS1-1b and a 1-2-th sub support part SBS1-2b, and the second sub support part SBS2b may include a 2-1-th sub support part SBS2-1b and a 2-2-th sub support part SBS2-2b.

A first cushion layer CUL1b may be disposed below a 1-1-th sub support part SBS1-1b and overlap a first non-folding part NFA1. A second cushion layer CUL2b may be disposed below a 2-1-th sub support part SBS2-1b and overlap a second non-folding part NFA2. The first cushion layer CUL1b and the second cushion layer CUL2b may be spaced apart from each other in the first direction DR1.

An auxiliary support part SSB may be disposed between the first cushion layer CUL1b and the second cushion layer CUL2b. The auxiliary support part SSB may include a first auxiliary support part SSB1 and a second auxiliary support part SSB2. The first auxiliary support part SSB1 may overlap a portion of the first sub support part SBS1b and a portion of the folding part FA adjacent to the first non-folding part NFA1, and the second auxiliary support part SSB2 may overlap a portion of the second sub support part SSB2 and another portion of the folding part FA adjacent to the second non-folding part NFA2. The first auxiliary support part SSB1 and the second auxiliary support part SSB2 may be spaced apart from each other in the first direction DR1.

The first auxiliary support part SSB1 may be connected to the first sub support part SBS1b in the first non-folding part NFA1, and the second auxiliary support part SSB2 may be connected to the second sub support part SBS2b in the second non-folding part NFA2.

The specific gravity of the auxiliary support part SSB may be the same as that of each of the first support part SUP1b and the second support part SUP2b. According to an embodiment, each of the first support part SUP1b, the second support part SUP2b, and the auxiliary support part SSB may not include stainless steel, but may include carbon fiber reinforced plastics (CFRP) or an Al alloy. Thus, the specific gravity of each of the first support part SUP1b, the second support part SUP2b, and the auxiliary support part SSB may be lower than that when each of the first support part SUP1b, the second support part SUP2b, and the auxiliary support part SSB includes stainless steel. However, the embodiment is not limited thereto, and each of the first support part SUP1b, the second support part SUP2b, and the auxiliary support part SSB may include a material having a specific gravity less than that of stainless steel.

Since each of the first support part SUP1b, the second support part SUP2b, and the auxiliary support part SSB includes the material having the specific gravity less than that of stainless steel, a lower module LMb including the first support part SUP1b, the second support part SUP2b, and the auxiliary support part SSB may be reduced in weight.

In the lower module LMb, a cushion layer CULb and the auxiliary support SSB may be directly disposed on the same surface as a bottom surface of the cover layer CVL. Thus, the lower module LMb may be lighter than each of the lower modules LM and LMa, and the thickness of the lower module LMb in the third direction DR3 may be further reduced.

Figure 9:
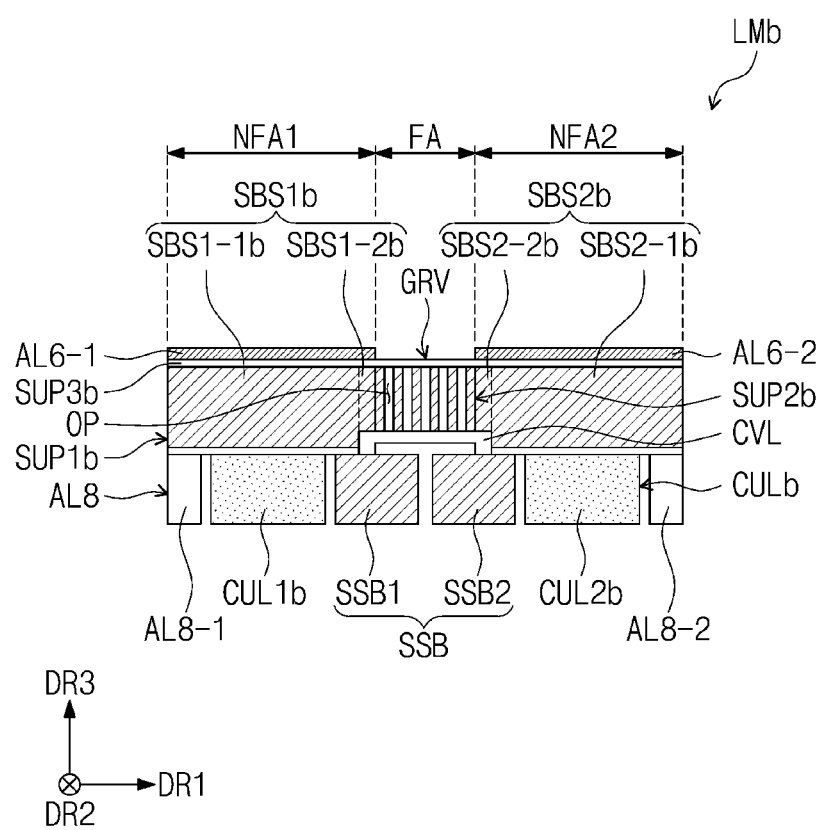
FIG. 9 is a schematic cross-sectional view of a lower module according to an embodiment of the disclosure.

FIG. 9 is a schematic cross-sectional view of the lower module according to an embodiment.

FIG. 9 is a schematic view illustrating an example of the lower module LMb including the Al alloy. For convenience of description, the same reference numerals are used to denote the same components as those of the lower module LMb illustrated in FIG. 8, and descriptions thereof will be omitted.

Referring to FIG. 9, each of a first support part SUP1b, a second support part SUP2b, and an auxiliary support part SSB of the lower module LMb may include an Al alloy. In the first support part SUP1b, the second support part SUP2b, and the auxiliary support part SSB, each of which includes the Al alloy, a third support part SUP3b may be disposed on a top surface of the first support part SUP1b, a top surface of the second support part SUP2b, a bottom surface of a 1-1-th sub support part SBS1-1b, and a bottom surface of a 2-1-th sub support part SBS2-b.

The hardness of the third support part SUP3b may be greater than that of each of the first support part SUP1b, the second support part SUP2b, and the auxiliary support part SSB.

The third support part SUP3b may cover (or overlap) surfaces of the first support part SUP1b, the second support part SUP2b, and the auxiliary support part SSB to reinforce the hardness of each of the first support part SUP1b, the second support part SUP2b, and the auxiliary support part SUB.

The auxiliary support part SSB may be attached to the first support part SUP1b by ultrasonic welding. The first auxiliary support part SSB1 may contact a portion of the bottom surface of the 1-1-th sub support part SBS1-1b, and high-frequency vibration may be applied to the first auxiliary support part SSB1. The surfaces, on which the first auxiliary support part SSB1 and the 1-1-th sub support part SBS1-1b contact each other, may be attached to each other in a reconnection process after an oxide film is removed by the high-frequency vibration. The second auxiliary support part SSB2 may also be attached to a portion of the bottom surface of the 2-1-th sub support SBS2-1b in a same manner as described above. However, this is merely an example, and the attachment method of the auxiliary support part SSB and the first support part SUP1b is not limited thereto.

The third support part SUP3b may prevent scratches and damage from occurring on the surfaces of the first support part SUP1b, the second support part SUP2b, and the auxiliary support part SSB. Thus, surface properties of the first support part SUP1b, the second support part SUP2b, and the auxiliary support part SSB may be improved by the third support part SUP3b.

According to an embodiment, since the support part of the display panel includes the material having the specific gravity less than that of stainless steel, the weight of the support part under the display panel may be reduced.

It will be apparent to those skilled in the art that various modifications and variations can be made in the disclosure. Thus, it is intended that the disclosure covers the modifications and variations of this disclosure provided they come within the scope of the appended claims and their equivalents. Thus, to the maximum extent allowed by law, the scope of the claimed invention is to be determined by the broadest permissible interpretation of the following claims and their equivalents, and shall not be restricted or limited by the foregoing detailed description.

What is claimed is:

1. A display device comprising:
   a display panel comprising a first non-folding part, a folding part, and a second non-folding part which are arranged in a first direction;
   a first support part disposed below the display panel, a groove being defined in a top surface of a portion of the first support part overlapping the folding part, and the first support part being foldable about the folding part;
   a second support part disposed in the groove, wherein the first support part has a specific gravity less than a specific gravity of the second support part; and
   a cover layer disposed in the groove and below the second support part.

2. The display device of claim 1, wherein the first support part comprises:
   a first sub support part disposed below the first non-folding part and a first portion of the folding part adjacent to the first non-folding part; and
   a second sub support part disposed below the second non-folding part and a second portion of the folding part adjacent to the second non-folding part,
   the groove is defined in top surfaces of the first and second sub support parts overlapping the folding part in a plan view.

3. The display device of claim 2, wherein the groove is further defined in top surfaces of the first and second sub support parts overlapping the portions of the first and second non-folding parts adjacent to the folding part in a plan view.

4. The display device of claim 2, wherein
   the first sub support part comprises:
      a 1-1-th sub support part disposed below the first non-folding part and having a first thickness; and
      a 1-2-th sub support part disposed below the first portion and having a second thickness less than the first thickness,
   the second sub support part comprises:
      a 2-1-th sub support part disposed below the second non-folding part and having the first thickness; and
      a 2-2-th sub support part disposed below the second portion and having the second thickness.

5. The display device of claim 4, wherein
   a top surface of the 1-2-th sub support part is stepped to be lower than a top surface of the 1-1-th sub support part,
   a top surface of the 2-2-th sub support part is stepped to be lower than a top surface of the 2-1-th sub support part, and
   bottom surfaces of the 1-1-th, 1-2-th, 2-1-th, and 2-2-th sub support parts are defined on a same surface.

6. The display device of claim 4, wherein
   the 1-1-th sub support part and the 1-2-th sub support part are integrated with each other, and
   the 2-1-th sub support part and the 2-2-th sub support part are integrated with each other.

7. The display device of claim 2, wherein the cover layer overlaps a space between the first sub support part and the second sub support part in a plan view.

8. The display device of claim 1, wherein a dummy groove overlapping the folding part in a plan view is defined in a bottom surface of the cover layer.

9. The display device of claim 1, wherein openings extending in a second direction and arranged in the first direction are defined in the second support part.

10. The display device of claim 9, wherein the cover layer overlaps the openings in a plan view.

11. The display device of claim 1, further comprising:
    a third support part disposed on a top surface of the first support part and a top surface of the second support part which overlap the first and second non-folding parts,
    wherein the third support part has a hardness greater than a hardness of the first support part and less than a hardness of the second support part.

12. The display device of claim 1, wherein
    the first support part and the second support part are integrated with each other, and
    openings extending in a second direction and arranged in the first direction are defined in the second support part overlapping the folding part in a plan view.

13. The display device of claim 12, further comprising:
    a first auxiliary support part disposed below the cover layer and connected to a side of the first support part; and
    a second auxiliary support part disposed below the cover layer and connected to another side of the first support part, wherein the first auxiliary support part and the second auxiliary support part are spaced apart from each other in the first direction.

14. The display device of claim 13, wherein each of the first and second auxiliary support parts has a thickness less than a difference in thickness between the first support part and the second support part.

15. The display device of claim 13, wherein each of the first auxiliary support part and the second auxiliary support part and each of the first support part and the second support part have a same specific gravity.

16. The display device of claim 13, further comprising:
a first cushion layer disposed below the first support part and overlapping the first non-folding part in a plan view; and
a second cushion layer disposed below the first support part and overlapping the second non-folding part in a plan view,
wherein the first auxiliary support part and the second auxiliary support part are disposed between the first cushion layer and the second cushion layer.

17. The display device of claim 16, wherein
the first auxiliary support part partially overlaps the first support part in the first non-folding part in a plan view, and
the second auxiliary support part partially overlaps the first support part in the second non-folding part in a plan view.

18. The display device of claim 17, wherein
the first auxiliary support part is connected to the first support part in the first non-folding part, and
the second auxiliary support part is connected to the first support part in the second non-folding part.

19. The display device of claim 7, wherein the first sub support part and the second sub support part include carbon fiber reinforced plastics (CFRP) or an Al alloy.

20. The display device of claim 1, wherein the cover layer is disposed between the first support part and the second support part.

* * * * *